US007525273B2

(12) United States Patent
Hashimoto et al.

(10) Patent No.: US 7,525,273 B2
(45) Date of Patent: Apr. 28, 2009

(54) ROBOT CONTROL SYSTEM

(75) Inventors: Yoshiki Hashimoto, Kanagawa (JP); Yoshiyuki Kubo, Yamanashi (JP); Nobuo Chino, Yamanashi (JP); Yoshikiyo Tanabe, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 295 days.

(21) Appl. No.: 11/619,514

(22) Filed: Jan. 3, 2007

(65) Prior Publication Data

US 2007/0152617 A1 Jul. 5, 2007

(30) Foreign Application Priority Data

Jan. 4, 2006 (JP) ............................ 2006-000129

(51) Int. Cl.
*B25J 19/06* (2006.01)

(52) U.S. Cl. .......................... 318/519; 318/563; 361/31

(58) Field of Classification Search ................. 318/563, 318/565, 568.11, 430–434, 494, 508, 514, 318/519, 520; 361/23, 31; 363/49, 50, 56.12
See application file for complete search history.

(56) References Cited

U.S. PATENT DOCUMENTS

| | | | | |
|---|---|---|---|---|
| 6,278,910 | B1 * | 8/2001 | Miura et al. | 700/297 |
| 6,353,545 | B1 * | 3/2002 | Ueda | 363/40 |
| 6,900,606 | B2 * | 5/2005 | Youm | 318/375 |
| 6,966,803 | B2 * | 11/2005 | Hara et al. | 440/6 |
| 7,068,010 | B2 * | 6/2006 | Youm | 318/778 |
| 7,230,395 | B2 * | 6/2007 | Horii | 318/139 |
| 2002/0070608 | A1 | 6/2002 | Tsutomu et al. | |

FOREIGN PATENT DOCUMENTS

| | | | |
|---|---|---|---|
| EP | 1610355 | A1 | 12/2005 |
| JP | 06233401 | A | 8/1994 |
| JP | 6345350 | A | 12/1994 |
| JP | 2003259648 | A | 9/2003 |
| JP | 2004104852 | A | 4/2004 |
| JP | 2004-237416 | A | 8/2004 |
| JP | 2005003133 | A | 1/2005 |

(Continued)

OTHER PUBLICATIONS

Notice of Reasons for Rejection of Patent Application No. 2006-000129 mailed Jan. 8, 2008.

(Continued)

*Primary Examiner*—Bentsu Ro
(74) *Attorney, Agent, or Firm*—Lowe, Hauptman, Ham & Berner, LLP

(57) ABSTRACT

A robot control system including a servo amplifier supplying power to a robot, a processor controlling the operation of the robot, and a servo power connection/cutoff circuit connected to the same, issuing excitation/nonexcitation commands to a charging relay and a main circuit connection electromagnetic contactor provided in the circuit from the processor, monitoring the opened/closed states of the contacts of the charging relay and main circuit connection electromagnetic contactor by the processor, and detecting if their contacts open and close as instructed by the processor to thereby check if the power connection/cutoff circuit has a fault. Due to this, it is possible to provide a robot control system which detects faults of the power connection/cutoff circuit and which is inexpensive and high in safety.

5 Claims, 8 Drawing Sheets

FOREIGN PATENT DOCUMENTS

| | | | |
|---|---|---|---|
| JP | 2005004554 | A | 1/2005 |
| JP | 2005004555 | A | 1/2005 |
| JP | 2005004556 | A | 1/2005 |
| JP | 2005004557 | A | 1/2005 |
| JP | 2005025260 | A | 1/2005 |
| JP | 2005025479 | A | 1/2005 |
| JP | 2005-165755 | A | 6/2005 |

OTHER PUBLICATIONS

Notice of Reasons for Rejection for JP2006-000129 mailed May 20, 2008.

* cited by examiner

ROBOT CONTROL SYSTEM

BACKGROUND OF THE INVENTION

1. Field of the Invention

The present invention relates to a robot control system and, more particularly, relates to a robot control system having an inexpensive, high safety servo power connection/cutoff circuit utilizing software.

2. Description of the Related Art

A servo amplifier of a robot control system is provided with an AC/DC converter. In such a servo amplifier, when the power is turned on, a large rush current would flow through a smoothing capacitor in the servo amplifier (hereinafter simply referred to as a "capacitor"), so the robot control system is provided with a precharging circuit.

At the time of startup of the servo amplifier, to enable a charging resistance in the precharging circuit (hereinafter simply referred to as the "resistance") and a serial contact (relay or solenoid switch) to perform the precharging at the time of startup, then connect to the main power source, a main circuit contact is provided parallel to the serial line between the resistance and serial contact, the contact in series with the resistance is closed to start the precharging, the capacitor is charged, then the main circuit contact is closed.

On the other hand, when cutting the servo power at the time of an emergency stop, both the precharging contact and the main circuit contact are opened, but for safety's sake, it is necessary to detect faults such as melt fusion of the contacts.

In the related art, for example, in the emergency stop circuit described in Japanese Patent Publication (A) No. 2004-237416 (see specification, paragraph nos. [0023] to [0037] and drawings, FIGS. 3 and 4) or Japanese Patent Publication (A) No. 2005-165755 (see claims, [Claim 1], specification, paragraph nos. [0023] to [0037], and drawings, FIGS. 1 and 2), the function of detecting melt fusion faults of contacts was realized by using hardware circuits, but the circuits were complicated and the costs high.

FIG. 1 is a general electrical system diagram of the robot 1 and the robot control system 2. The controller 11 shown in FIG. 1 includes a CPU for controlling the robot operation and its peripheral circuits and enables the robot 1 to perform predetermined work by issuing commands to the servo amplifier 12 to control the robot 1 in operation and posture.

Further, the controller 11 has a teaching pendant 13 connected to it. The teaching pendant 13 is operated by a worker to teach the robot 1 an operation or to input various settings into the robot control system 2.

The servo amplifier 12 drives a servo motor attached to each joint of the robot 1 based on a command from the controller 11. Further, the servo amplifier 12 receives feedback information relating to the rotational angle and speed from a rotary encoder attached to each servo motor through a signal line 15 and transmits information necessary for control of these servo motors to the controller 11.

The servo power connection/cutoff circuit 14 turns on the drive power for the servo motors of the robot 1 through the servo amplifier 12 and power line 16 in accordance with a request for startup of the robot 1 or immediately cuts the supply of drive power to the servo motors to ensure safety when there is a request for emergency stop.

FIG. 2 is a block diagram of the configuration of the servo amplifier 12 shown in FIG. 1. The servo amplifier 12 has an AC/DC converter 21 for converting a drive power, that is, an AC power, to a DC power and an inverter 22 for converting a DC power to an AC power controlled in current by a command from the controller 11. Further, to smooth the output voltage of the AC/DC converter 21, a large capacity smoothing capacitor 23 is provided. The inverter 22 receives as input the DC voltage smoothed by the capacitor 23.

When connecting the servo power to the servo amplifier 12, if directly applying the power voltage in the state with the capacitor 23 insufficiently charged, a large rush current would flow into the capacitor 23 and the electrical circuits in the current path would be adversely affected or a temporary voltage drop would be caused, so before connecting the power source, the general practice has been to precharge the capacitor 23 through a resistance.

FIG. 3 is a view of details of the servo power connection/cutoff circuit 14 shown in FIG. 1, while FIG. 4 is a view showing the change in state of the servo power connection/cutoff circuit 14 shown in FIG. 3. The servo power connection/cutoff circuit 14 shown in FIG. 3 has the function of cutting the supply of drive power to the servo amplifier 12 (hereinafter referred to as the "servo power") when the operator pushes the emergency stop switch 31 and the function of connecting the servo power when the operator releases the emergency stop switch 31 and pushes the reset switch 32.

Further, when connecting the servo power, it has the function of precharging to prevent a large rush current from flowing to the servo amplifier 12.

Below, details of the servo power connection/cutoff circuit 14 will be explained. In FIG. 3 and FIG. 4, KA1, KA2, and KA3 indicate relays, while KM1 and KM2 indicate electromagnetic contactors. The relays and electromagnetic contactors used are ones for which linkage between normally open contacts and normally closed contacts is ensured (interlocked).

For example, when the contact KM1-1 of the KM1 is closed, the normally open contacts KM1-4 to KM1-6 being in the open state is guaranteed.

First, these relays (KA1 to KA3) and electromagnetic contactors (KM1, KM2) are all in the OFF state (state of S0 of FIG. 4).

At this time, if the relays and electromagnetic contactors are free of faults such as melt fusion or reset defects of the normally open contacts and the normally open contacts open, the contacts KA2-2, KM1-1, KA3-2, and M2-1 become closed.

If the operator pushes the reset switch 32 in this state, the KA1 enters the ON state and the KA1-1 and KA1-2 close (state of S1 of FIG. 4). At this time, if the emergency stop signal switch 31 is in the closed state, the KA2 and KA3 turn ON through these contacts (state of S2 of FIG. 4). Note that if the emergency stop switch 32 is in the opened state, KA2 and KA3 will never turn ON.

If the KA2 and KA3 turn ON, the KA2-2 and KA3-2 are opened, so the KA1 enters the OFF state, but current flows through the KA2-1 and KA3-1, so while the emergency stop switch 31 is in the closed state, the ON states of KA2 and KA3 are held (state of S3 of FIG. 4). Therefore, the operation of pushing the reset switch 32 may be short in time.

When the KA2 becomes ON and the KA1 becomes OFF, the KM1-3 and the KM2-3 become closed and the KM1 is ON. At this time, the KM1-4 to KM1-6 and the KA3-4 to KA3-6 are in the closed state and the KA3 is ON, so the capacitor 23 in the servo amplifier 12 is charged through the KA3-4 to KA3-6 and charging resistance 35. The current at this time is limited by the charging resistance 35, so a large rush current will not flow.

The power-up delay circuit 36 is set so as to turn ON the KM2 through the KA1-3 to KA3-3 after the time for the capacitor 23 in the servo amplifier 12 to be sufficiently charged elapses from the time when the KA3 turns ON. Due to this, the rush current is prevented from flowing when the KM2-4 to KM2-6 are ON.

In the above way, finally, only the KA1 enters the OFF state while the other KA2, KA3, KM1, and KM2 all become the ON state, whereby the preparations for operation end (state of S4 of FIG. 4).

When the button of the emergency stop switch 31 is pushed, all of the relays (KA1 to KA3) and electromagnetic contactors (KM1, KM2) turn OFF and the initial state (state of S0 of FIG. 4) is returned to.

In the event that in the relays or electromagnetic contactors forming the servo power connection/delay circuit 14, the normally open contacts melt fuse or other reasons occur in the initial state (S0) and the normally open contacts can no longer be reset, the contacts corresponding to the faulty parts in the KA2-2, KM1-1, KA3-2, and M2-1 will not become the closed state. Therefore, the change from S0 to S1 will not occur and the servo amplifier will not enter a state where it is supplied with power, that is, the state of S3 and S4 will not be reached. Therefore, the operator will notice the fault and servo power will not longer be supplied in the faulty state, so safety will be secured.

Due to the above power connection/cutoff circuit, safety against a fault in the power connection/cutoff circuit can be secured. Due to the precharging, the rush current to the servo amplifier can be suppressed. Due to the increased complexity of the circuit and the increase in the number of parts, an increase in cost cannot be avoided. Further, relays where linkage between the normally open and normally closed contacts is guaranteed are extremely expensive compared with general relays. This also is a factor to increase costs.

Before turning the servo power ON, it is possible to detect faults in the power connection/cutoff circuit, but once turning the power ON, there is the problem that a fault cannot be detected while ON.

SUMMARY OF THE INVENTION

An object of the present invention is to provide a robot control system which detects faults of a power connection/cutoff circuit and which is inexpensive and high in safety.

To achieve the above object, there is provided a robot control system controlling a servo power connection/cutoff circuit by using a processor, having the processor issue connection/cutoff commands to a precharging relay and a main circuit connection electromagnetic contactor, and able to monitor the states of connection/cutoff from the processor, the robot control system having the processor detect if their contacts have opened/closed as instructed so as to detect if the servo power connection/cutoff circuit has a fault.

Specifically, there is provided a robot control system provided with a processor, a servo amplifier having an AC/DC converter, a resistance for preventing a rush current at the time of charging a smoothing capacitor in the AC/DC converter, a first contact connected in series to the resistance, a first switch circuit opening/closing the first contact by a command from the processor, a first detection circuit detecting an opened/closed state of the first contact and notifying it to the processor, a second contact provided in parallel to the resistance and first contact, a second switch circuit opening/closing the second contact by a command from the processor, and a second detection circuit detecting an opened/closed state of the second contact and notifying it to the processor, the robot control system operating so that when charging the capacitor, it closes the first contact to charge the capacitor, then closes the second contact, wherein the processor commands the first switch circuit and second switch circuit to open/close the first contact and second contact and wherein the first detection circuit and second detection circuit detect if the first contact and second contact open/close as instructed so as to check for abnormalities of the first contact and second contact.

According to the present invention, it becomes possible to provide a robot control system having an inexpensive, high safety servo power connection/cutoff circuit enabling deliberate opening/closing of the contact of the precharging relay and the contact of the main circuit electromagnetic contactor and a check of the operations of the precharging relay and the main circuit electromagnetic contactor even while the power of the servo amplifier is ON.

BRIEF DESCRIPTION OF THE DRAWINGS

These and other objects and features of the present invention will become clearer from the following description of the preferred embodiments given with reference to the attached drawings, wherein:

FIG. 7 is a time chart showing a first fault check method of a servo power connection/cutoff circuit after the servo power is turned on;

FIG. 8 is a time chart showing a second fault check method of a servo power connection/cutoff circuit after the servo power is turned on.

DESCRIPTION OF THE PREFERRED EMBODIMENTS

Preferred embodiments of the present invention will be described in detail below while referring to the attached drawings.

Figure 1:
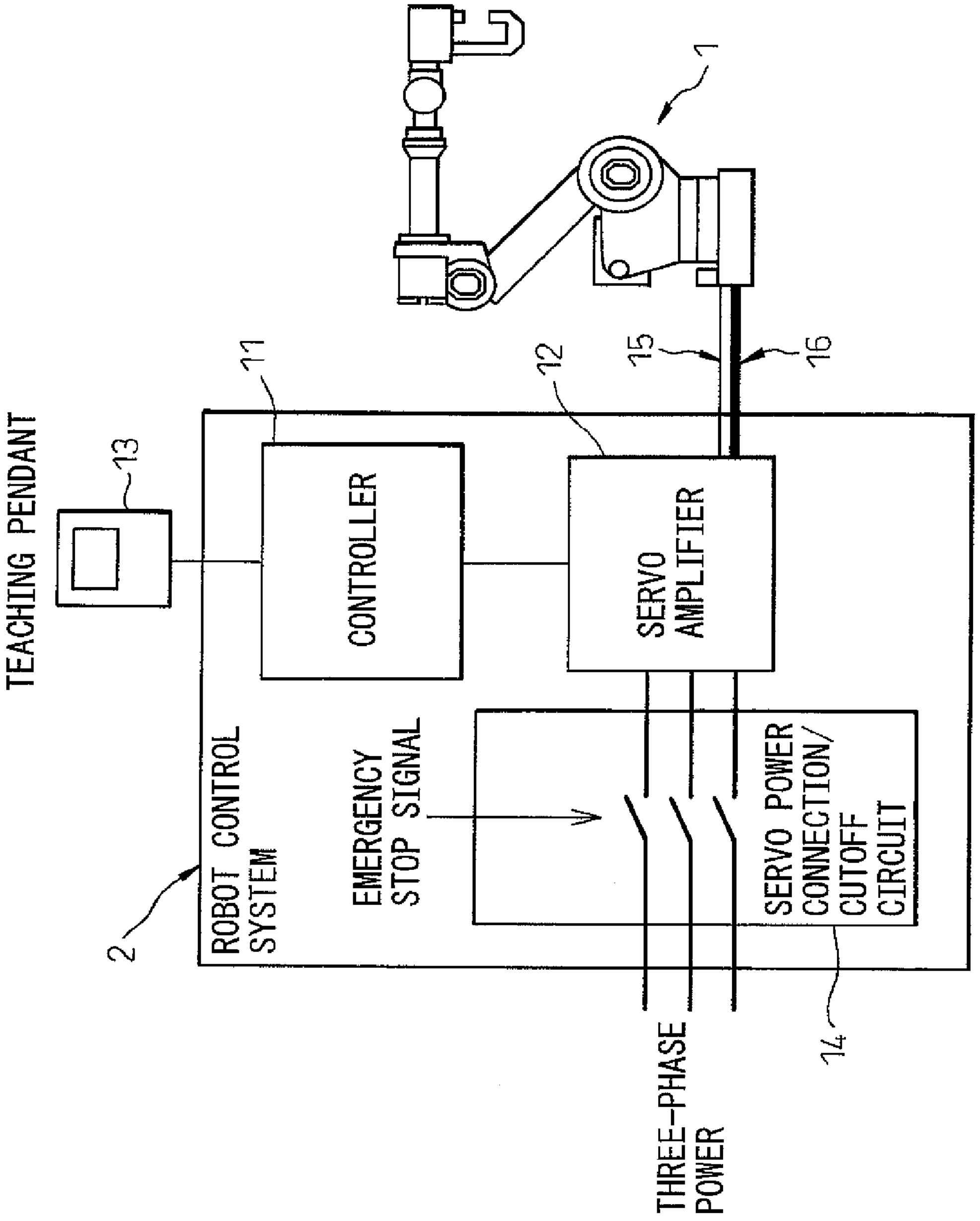
FIG. 1 is a general electrical system diagram of a robot and a robot control system.
Figure 2:
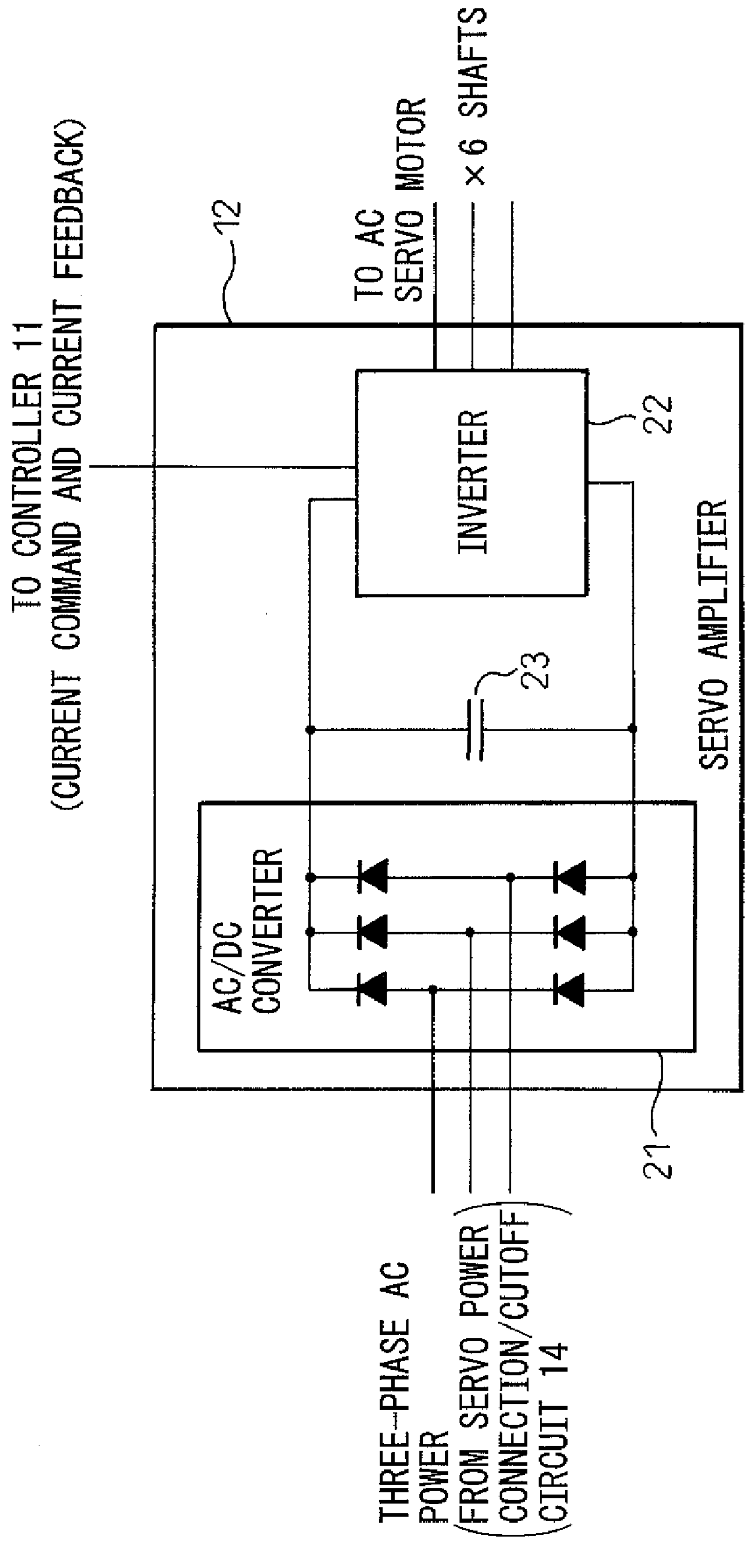
FIG. 2 is a block diagram of the configuration in a servo amplifier shown in FIG. 1.
Figure 3:
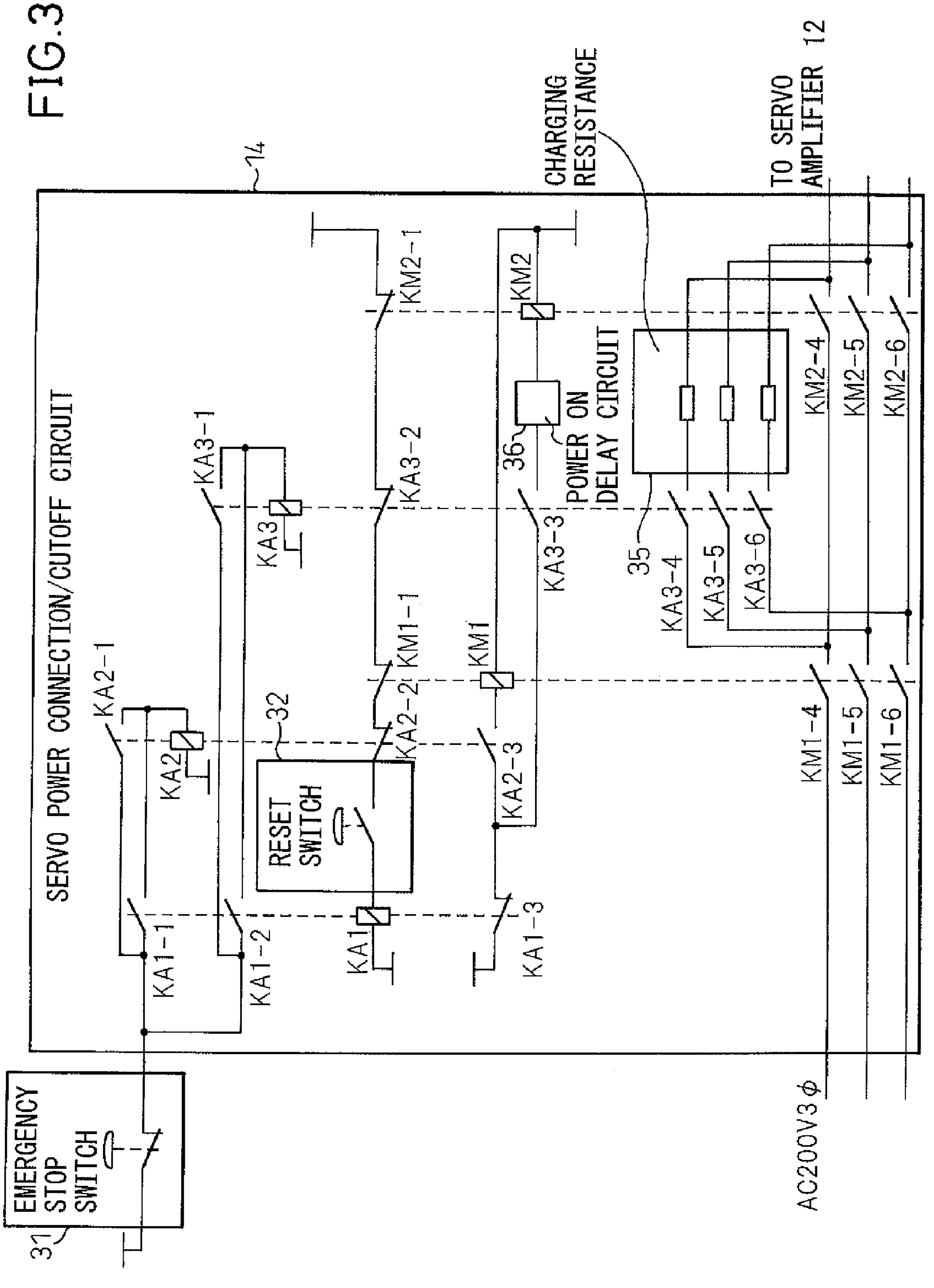
FIG. 3 is a view showing details of the servo power connection/cutoff circuit shown in FIG. 1.
Figure 4:
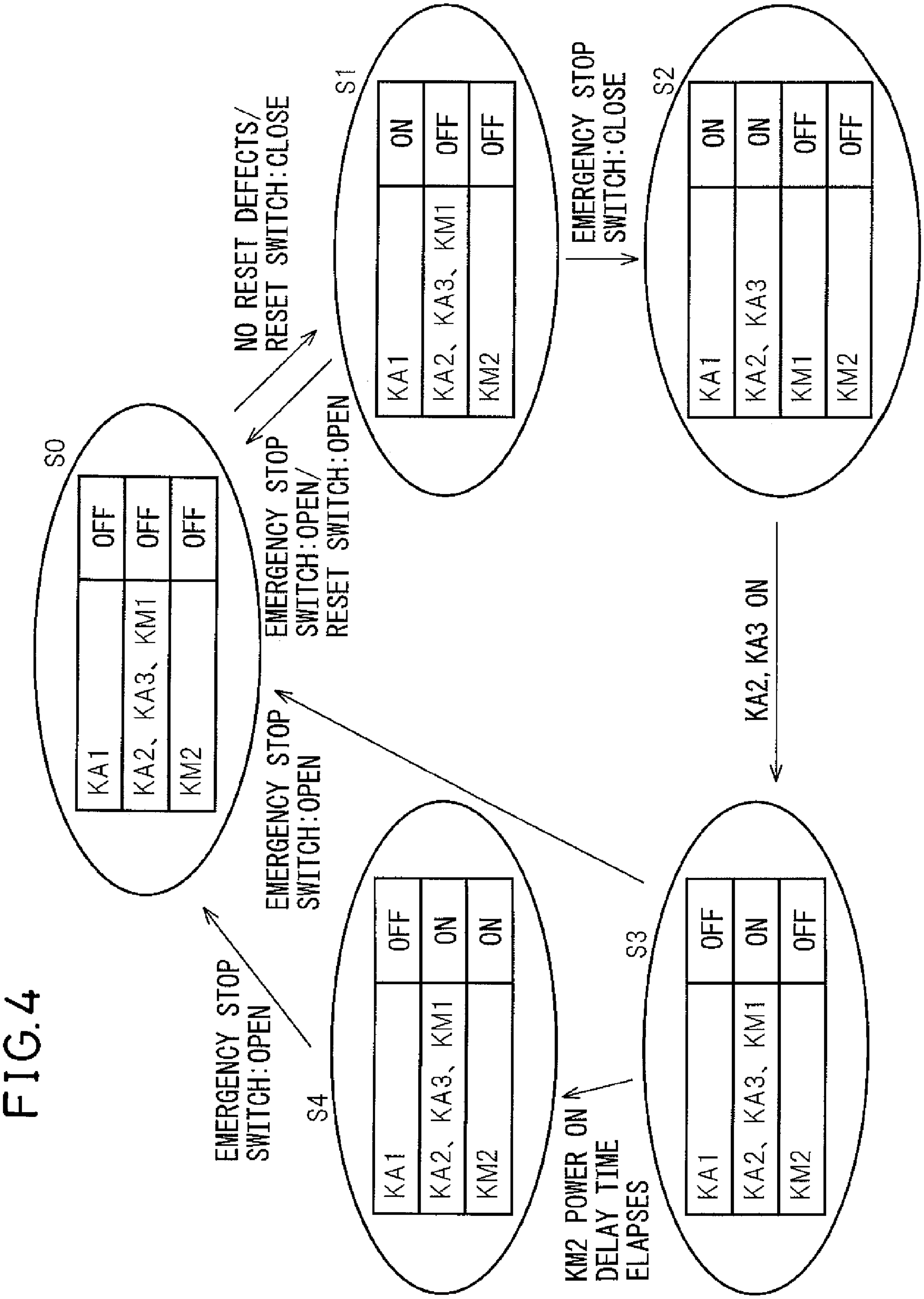
FIG. 4 is a view showing the changes in state of the servo power connection/cutoff circuit shown in FIG. 3.
Figure 5:
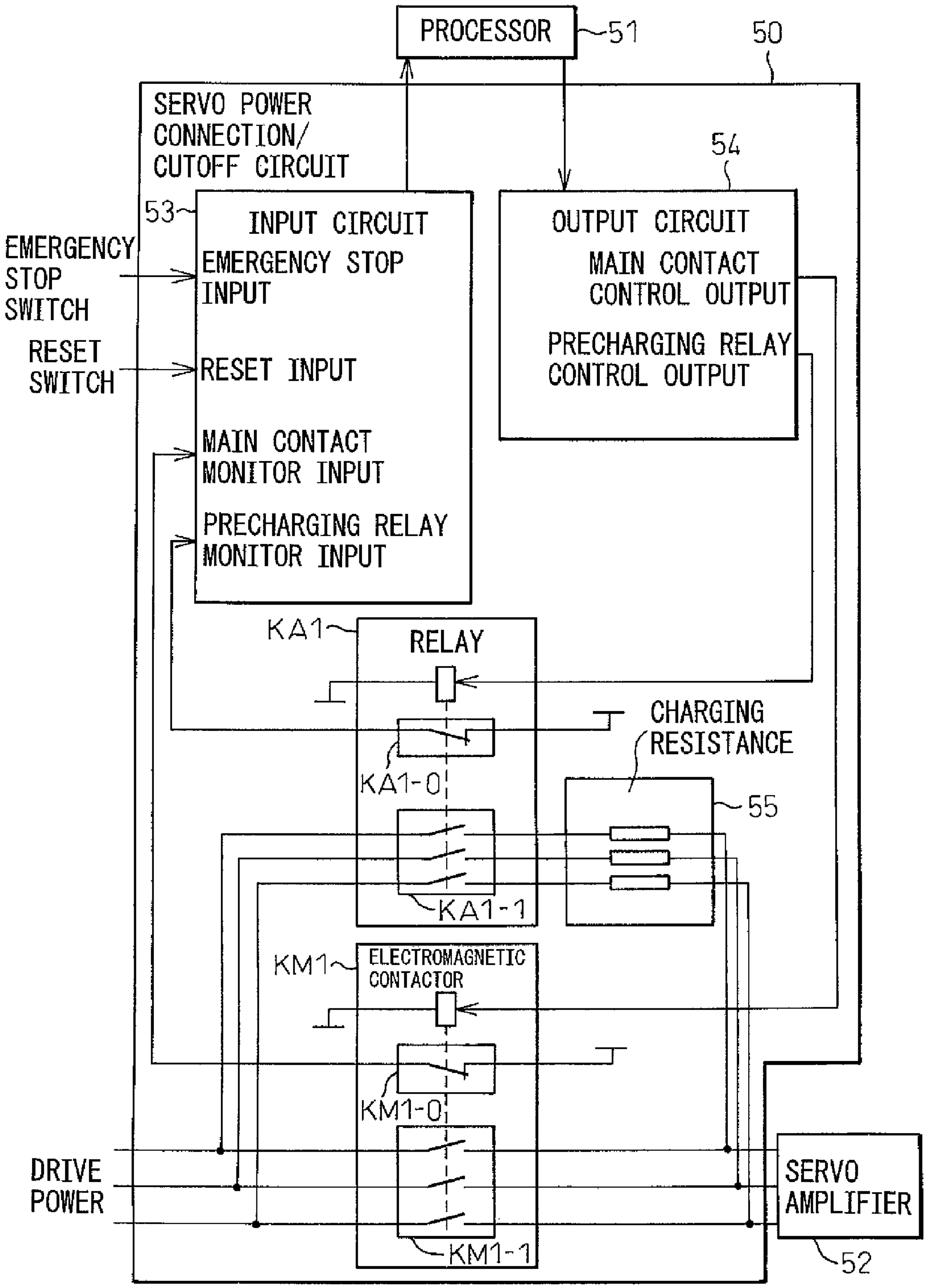
FIG. 5 is a view of a first embodiment of a servo power connection/cutoff circuit according to present invention.

FIG. 5 is a view of a first embodiment of a servo power connection/cutoff circuit according to the present invention. As shown in FIG. 5, the servo power connection/cutoff circuit 50 is connected to a processor 51 and a servo amplifier 52. An emergency stop switch, a reset switch, a contact KA1-0 of a precharging relay KA1, and a contact KM1-0 of a main circuit electromagnetic contactor KM1 are connected to an input circuit 53. The states of these switches and contacts can be read by the processor 51. The capacitor in the servo amplifier 12 is charged through a contact KA1-1 of the precharging relay KA1 and charging resistance 55.

Further, signal lines instructed from the processor 51 and output from an output circuit 54 are connected to a coil exciting the precharging relay KA1 and a coil exciting the main contact electromagnetic contactor KM1 and enable the processor 51 to control the opening/closing of the contacts of the precharging relay KA1 and main contact electromagnetic contactor KM1.

First, the method of checking for a fault of the servo power connection/cutoff circuit 50 at the time of turning on the servo power will be explained using FIG. 6.

Figure 6:
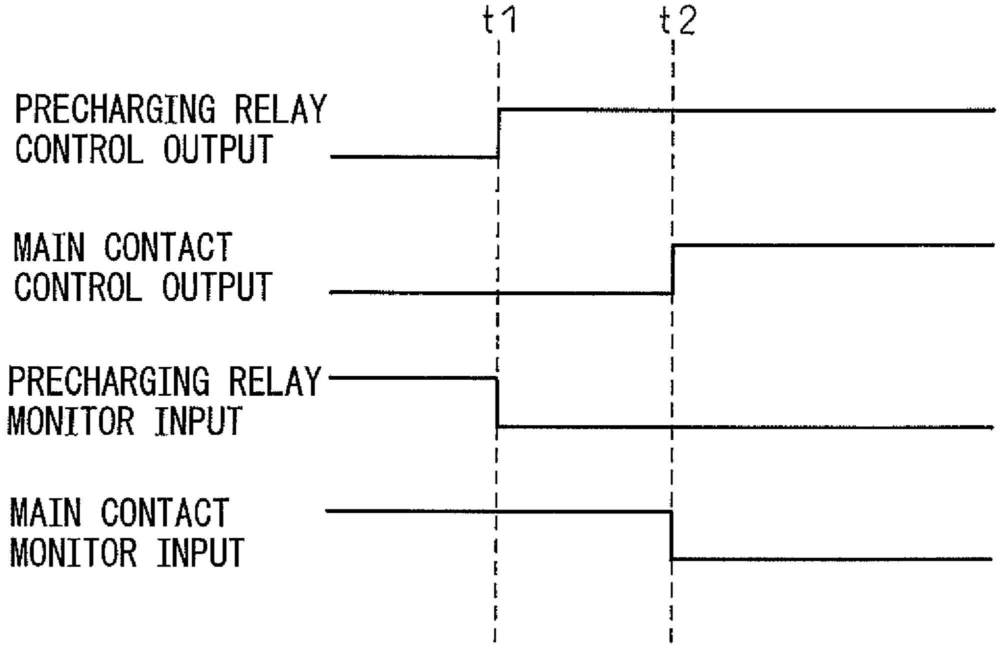
FIG. 6 is a time chart showing the sequence when turning on the servo power.

FIG. 6 is a time chart showing the sequence when turning on the servo power. First, when turning on the servo power, the precharging relay KA1 and the electromagnetic contactor KM1 all are OFF. At this time, if the normally open contact KA1-1 of the relay KA1 and the normally open contact KM1-1 of the electromagnetic contactor KM1 are free from faults such as melt fusion or reset defects and the normally open contacts KA1-1 and KM1-1 open, the normally closed contact KA1-0 of the relay KA1 and the normally closed contact KM1-0 of the electromagnetic contactor KM1 become the closed state. The states of these normally closed contacts KA1-0 and KM1-0 can be read from the processor 51 through the precharging relay monitor input and main contact monitor input in the input circuit 53, so the processor 51 can judge that the precharging relay KA1 and electromagnetic contactor KM1 are free from faults.

If the operator pushes the reset switch in this state, the processor 51 detects that the reset switch has been pushed through the input circuit 53. At this time, only when the fact that the emergency stop signal switch is in the closed state and both the precharging relay monitor input and main contact monitor input are ON, that is, are in the closed contact states can be read through the input circuit 53, the processor 51 issues an ON command to the precharging relay KA1 (timing of t1).

The processor 51 turns ON the precharging relay KA1, then after a certain time or after detecting that the capacitor in the servo amplifier 52 is sufficiently charged, issues an ON command to the main circuit electromagnetic contact KM1 (timing of t2).

After the timing of t2, the fact that the precharging relay monitor input and main contact monitor input are both in the OFF state is read by the processor 51, wherein the fact that the input circuit 53 is free from a fault is confirmed.

Next, the method for checking for a fault in the servo power connection/cutoff circuit 50 after turning on the servo power will be explained using FIG. 7.

Figure 7:
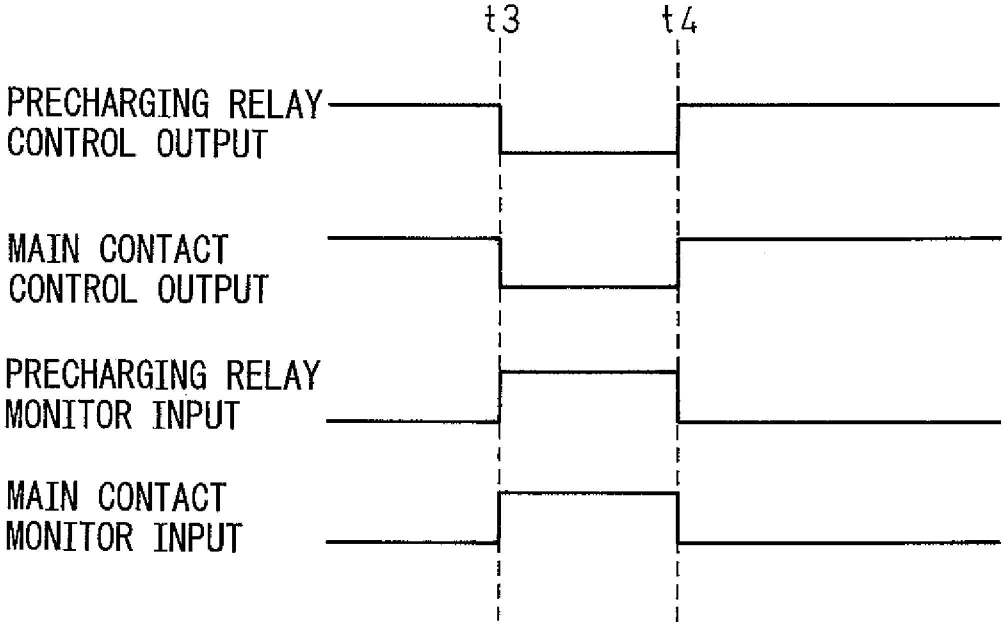

FIG. 7 is a time chart showing a first fault check method of the servo power connection/cutoff circuit after turning on the servo power. After turning on the servo power, the precharging relay KA1 and electromagnetic contactor KM1 are both in the ON state. In this state, the processor 51 issues them OFF commands (timing of t3). At this time, if the relay KA1 and the electromagnetic contactor KM1 are free from faults such as melt fusion or reset defects of the normally open contacts KA1-1 and KM1-1 and the normally open contacts KA1-1 and KM1-1 open, the normally closed contacts KA1-0 and KM1-0 of the relay KA1 and electromagnetic contactor KM1 become the closed states. The states of the normally closed contacts KA1-0 and KM1-0 can be read through the precharging relay monitor input and main contact monitor input from the processor 51, so the processor 51 confirms that the precharging relay KA1 and electromagnetic contactor KM1 are free from faults.

After this, immediately, the precharging relay KA1 and electromagnetic contactor KM1 are issued ON commands, and the precharging relay KA1 and electromagnetic contactor KM1 return to the ON states (timing of t4). While the precharging relay KA1 and electromagnetic contactor KM1 are OFF, the servo amplifier 52 is not supplied with power, but this is an extremely short time of tens of milliseconds. During this time, by continuing the operation by the charged power of the capacitor in the servo amplifier 52, the effect on the robot operation can be almost completely ignored.

This fault check can be performed by a command from the processor 51, so can be performed while avoiding times of operations where the power consumption is large and suspension of the supply of power would be liable to have a detrimental effect. As examples, the fault check can be performed in a state braking the shafts of the robot and stopping the supply of torque to the servo motors, can be performed in a state while the robot is idle between one job and another etc.

Figure 8:
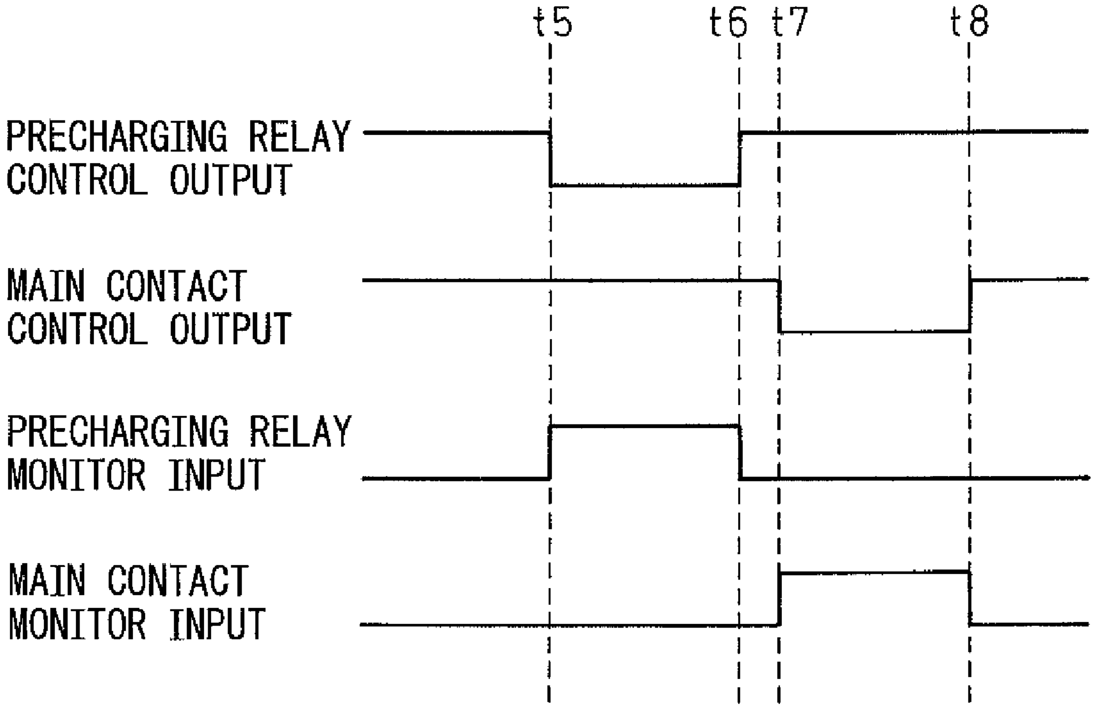

FIG. 8 is a time chart showing a second fault check method of a servo power connection/cutoff circuit after turning on the servo power. In the examples above, the precharging relay KA1 and the electromagnetic contactor KM1 were simultaneously checked for faults, but it is also possible to separate the timings for fault checks of the precharging relay KA1 and electromagnetic contactor KM1 and thereby enable fault checks without completely stopping the supply of power to the servo amplifier 52. This example will be explained below with reference to FIG. 8.

After turning on the servo power, the precharging relay KA1 and electromagnetic contactor KM1 are both in the ON state. In this state, the processor 51 issues an OFF command to the first precharging relay KA1 (timing of timing of t5). At this time, if the precharging relay KA1 is free from any fault such as melt fusion or reset defects of the normally open contact KA1-1 and the normally open contact KA1-1 opens, the normally closed contact KA1-0 of the precharging relay KA1 becomes the closed state. The state of the normally closed contact KA1-0 of the precharging relay KA1 can be read from the processor 41 through the precharging relay monitor input, so the processor 51 confirms that the precharging relay KA1 has no fault. The processor 51 then immediately issues an ON command to the precharging relay KA1, whereby the precharging relay KA1 and electromagnetic contactor KM1 return to the ON state (timing of t6).

The processor 51 next issues an OFF command to the electromagnetic contactor KM1 (timing of t7). At this time, if the electromagnetic contactor KM1 is free from a fault such as melt fusion or reset defects of the normally open contact KM1-1 and the normally open contact KM1-1 opens, the normally closed contact KM1-0 of the electromagnetic contactor KM1 becomes the closed state. The state of the normally closed contact KM1-0 of the electromagnetic contactor KM1 can be read by the processor 51 through the main contact monitor input, so the processor 51 confirms that the electromagnetic contactor KM1 is free from any fault. After this, it immediately issues an ON command to the electromagnetic contactor KM1, whereby the electromagnetic contactor KM1 returns to the ON state (timing of t8).

In accordance with this timing, when the precharging relay KA1 turns OFF, power is supplied to the servo amplifier 52 through the main circuit electromagnetic contactor KM1. Further, when the main circuit electromagnetic contact KM1 is OFF, power is supplied to the servo amplifier 52 through the precharging relay KA1, so it is possible to suppress to a minimum the effects of the fault check on the robot operation. Here, first the precharging relay KA1 is checked, then the electromagnetic contactor KM1 is checked, but the reverse order also gives exactly the same effect.

Note that, to facilitate understanding, in the first embodiment, the case of a single electromagnetic contactor was explained, but like with the circuit explained with reference to the related art, the present invention can also be worked in a circuit with two electromagnetic contactors.

Figure 9:
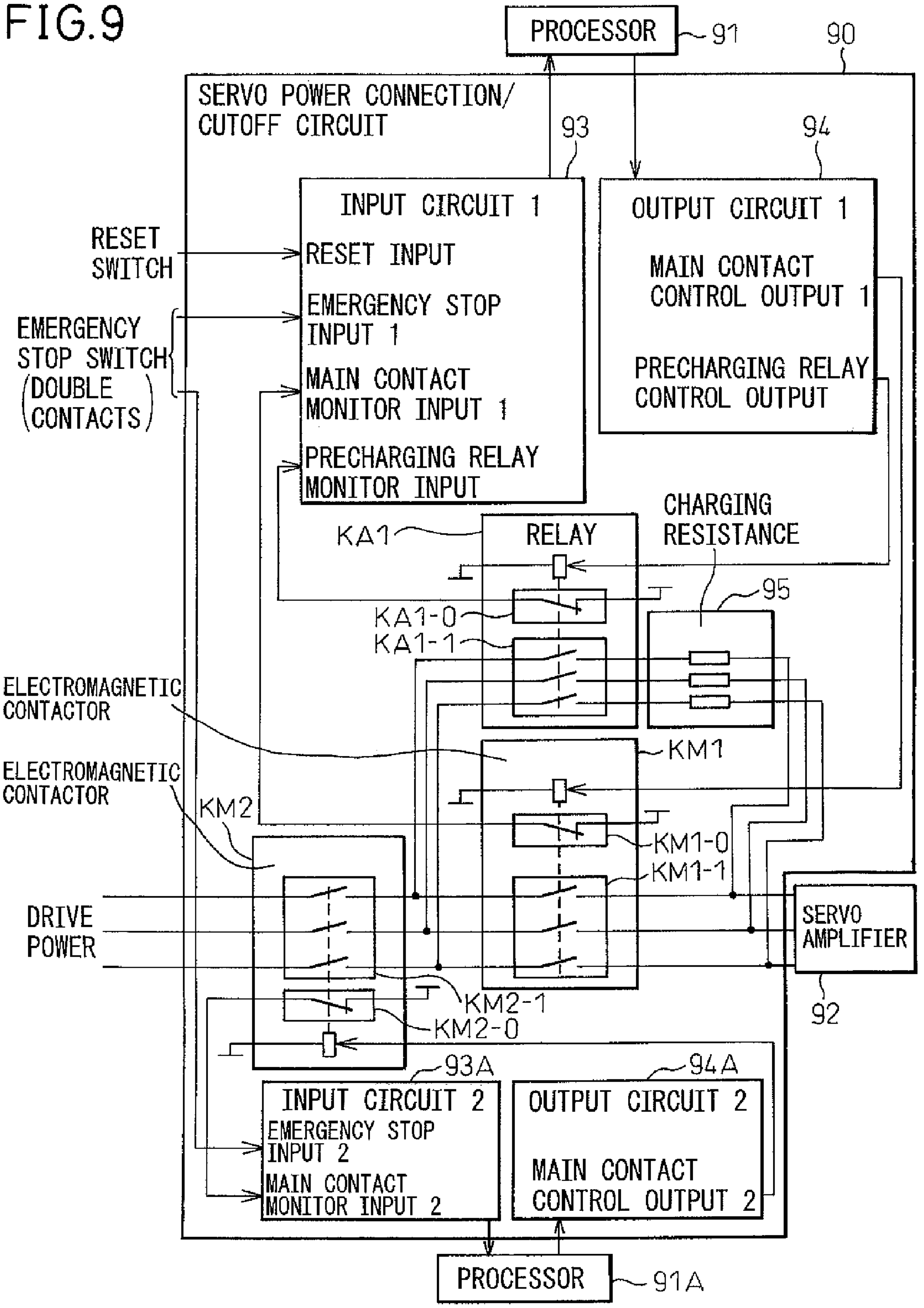
FIG. 9 is a view showing a second embodiment of a servo power connection/cutoff circuit according to the present invention.

FIG. 9 is a view of a second embodiment of a servo power connection/cutoff circuit according to the present invention. The second embodiment differs from the first embodiment shown in FIG. 5 in the point of provision of two electromagnetic contactors. In the servo power connection/cutoff circuit 90 of this second embodiment, in addition to the servo power connection/cutoff circuit 50 shown in FIG. 5, the second electromagnetic contactor KM2 is provided and control is performed from a second processor 91A separated from the first processor 91. The emergency stop switch used is a double contact one having a first contact and a second contact.

The first contact of the emergency stop switch, the reset switch, the contact KA1-0 of the precharging relay KA1, and the contact KM1-0 of the main circuit electromagnetic contactor KM1 are connected to the input circuit 93 and enable the states of these switches and contacts to be read from the processor 91. The capacitor in the servo amplifier 12 is charged through the contact KA1-1 of the precharging relay KA1 and charging resistance 95.

Further, signal lines instructed from the processor 91 and output from the output circuit 94 are connected to the coil exciting the precharging relay KA1 and the coil exciting the main contact electromagnetic contactor KM1 and enable control of the opened/closed states of the contacts of the precharging relay KA1 and main contact electromagnetic contactor KM1 from the processor 91.

The control by the second processor 91A is performed so that a fault in any one processor among the first processor 91 and the second processor 91A will not cause a loss of the emergency stop or other safety functions and is a general technique. In this case as well, these processors 91 and 91A can perform the check based on the present invention.

The second contact of the emergency stop switch and the contact KM2-0 of the main circuit electromagnetic contactor KM2 are connected to the input circuit 93A and enable the states of these switch and contact to be read from the processor 91A.

Further, the signal line instructed from the processor 91A and output from the output circuit 94A is connected to the coil exciting the main contact electromagnetic contactor KM2 and enables control of the open/closed state of the contact of the electromagnetic contactor KM2 from the processor 94A.

Further, to secure safety and minimize the effect of the fault check on the robot operation, it is also possible to check only the KA1 and KM1 by the fault check shown in FIG. 8 after turning on the servo power and not check the KM2 by the fault check after turning on the servo power source.

While the invention has been described with reference to specific embodiments chosen for purpose of illustration, it should be apparent that numerous modifications could be made thereto, by those skilled in the art, without departing from the basic concept and scope of the invention.

What is claimed is:

1. A robot control system provided with
a processor,
a servo amplifier having an AC/DC converter,
a resistance for preventing a rush current at the time of charging a smoothing capacitor in said AC/DC converter,
a first contact connected in series to said resistance,
a first switch circuit opening/closing said first contact by a command from said processor,
a first detection circuit detecting an opened/closed state of said first contact and notifying it to said processor,
a second contact provided in parallel to said resistance and first contact,
a second switch circuit opening/closing said second contact by a command from said processor, and
a second detection circuit detecting an opened/closed state of said second contact and notifying it to said processor,
said robot control system operating so that when charging said capacitor, it closes said first contact to charge said capacitor, then closes said second contact, wherein
said processor commands said first switch circuit and second switch circuit to open/close said first contact and second contact and wherein
said first detection circuit and second detection circuit detect if said first contact and second contact open/close as instructed so as to check for abnormalities of said first contact and second contact.

2. A robot control system as set forth in claim 1, wherein said first contact and second contact are checked for abnormalities when the robot is stopped and the robot is mechanically braked.

3. A robot control system as set forth in claim 1, wherein said first contact and second contact are checked for abnormalities in the state where the robot is stopped.

4. A robot control system as set forth in claim 1, wherein said first contact and second contact are checked for abnormalities while the robot is operating by the power charged to said capacitor or while the robot is in an operable state.

5. A robot control system as set forth in claim 1, which deliberately opens/closes said second contact to check whether the second contact operates as instructed while the robot is operating by the power passing through said first contact or while the robot is in an operable state.

* * * * *